United States Patent
Xu et al.

(10) Patent No.: US 12,095,772 B2
(45) Date of Patent: Sep. 17, 2024

(54) METHOD FOR MANAGING AND CONTROLLING SYSTEM PERMISSION, DATA CENTER, MANAGEMENT AND CONTROL APPARATUS, AND STORAGE MEDIUM

(71) Applicant: CHANGXIN MEMORY TECHNOLOGIES, INC., Hefei (CN)

(72) Inventors: Ying Xu, Hefei (CN); Yuewen Zheng, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 357 days.

(21) Appl. No.: 17/657,422

(22) Filed: Mar. 31, 2022

(65) Prior Publication Data

US 2023/0015450 A1 Jan. 19, 2023

(30) Foreign Application Priority Data

Jul. 16, 2021 (CN) .......................... 202110806641.6

(51) Int. Cl.
*H04L 9/40* (2022.01)
*G06Q 10/105* (2023.01)

(52) U.S. Cl.
CPC ......... *H04L 63/105* (2013.01); *G06Q 10/105* (2013.01); *H04L 63/104* (2013.01); *H04L 63/108* (2013.01)

(58) Field of Classification Search
CPC ... H04L 63/105; H04L 63/104; H04L 63/108; G06Q 10/105; G06F 21/604; G06F 21/6218; G06F 21/45; G06F 21/31
See application file for complete search history.

(56) References Cited

U.S. PATENT DOCUMENTS

| | | | | |
|---|---|---|---|---|
| 6,970,842 B1* | 11/2005 | Ashby | ................ | G06Q 20/3674 |
| | | | | 713/166 |
| 9,578,054 B1* | 2/2017 | Newman | ............. | G06F 12/1441 |
| 9,596,244 B1* | 3/2017 | Kozolchyk | ............. | H04L 63/06 |
| 10,439,815 B1* | 10/2019 | Poder | .................... | H04L 9/3236 |
| 10,498,583 B1* | 12/2019 | Davis | ................. | G06F 9/45558 |
| 10,748,364 B1* | 8/2020 | Kulshrestha | ........ | H04W 12/082 |

(Continued)

FOREIGN PATENT DOCUMENTS

CN 111737717 A 10/2020

*Primary Examiner* — Aravind K Moorthy
(74) *Attorney, Agent, or Firm* — Syncoda LLC; Feng Ma

(57) ABSTRACT

The present application relates to a method for managing and controlling a system permission, a data center, a management and control apparatus, and a storage medium. The method for managing and controlling a system permission includes: obtaining personnel change information, wherein the personnel change information includes personal information of a changed person and information about a position change mode of the changed person; obtaining a current permission interface of the changed person based on the personal information; determining, based on the permission interface, whether the changed person has an operation permission for a current object system; if the changed person has the operation permission for the current object system, determining whether the position change mode of the changed person is transfer; sending a notification message if the position change mode of the changed person is the transfer.

15 Claims, 5 Drawing Sheets

(56) References Cited

U.S. PATENT DOCUMENTS

| | | | | |
|---|---|---|---|---|
| 10,826,900 B1* | 11/2020 | Poder | | H04L 63/105 |
| 10,949,406 B1* | 3/2021 | Calvo | | G06F 16/215 |
| 11,615,199 B1* | 3/2023 | Poder | | G06F 21/6218 |
| | | | | 726/6 |
| 11,832,155 B1* | 11/2023 | Belwal | | H04W 4/50 |
| 2002/0095524 A1* | 7/2002 | Sanghvi | | G06F 9/542 |
| | | | | 719/318 |
| 2002/0178119 A1* | 11/2002 | Griffin | | G06F 21/604 |
| | | | | 707/999.001 |
| 2003/0153991 A1* | 8/2003 | Visser | | G06Q 10/10 |
| | | | | 700/83 |
| 2004/0098382 A1* | 5/2004 | Chuang | | G06F 16/93 |
| 2004/0172320 A1* | 9/2004 | Spellman | | G06Q 10/06398 |
| | | | | 705/7.42 |
| 2006/0075492 A1* | 4/2006 | Golan | | G06F 21/6218 |
| | | | | 726/22 |
| 2007/0043811 A1* | 2/2007 | Kim | | G06Q 50/16 |
| | | | | 709/203 |
| 2008/0168063 A1* | 7/2008 | Whitson | | G06F 21/604 |
| | | | | 707/E17.031 |
| 2008/0195546 A1* | 8/2008 | Lilley | | G06Q 30/0256 |
| | | | | 705/14.54 |
| 2009/0265754 A1* | 10/2009 | Hinds | | G06F 21/6218 |
| | | | | 726/1 |
| 2010/0218235 A1* | 8/2010 | Ganot | | H04L 41/0856 |
| | | | | 726/1 |
| 2012/0297455 A1* | 11/2012 | Novak | | G06F 21/6218 |
| | | | | 726/4 |
| 2012/0317418 A1* | 12/2012 | Brundridge | | H04L 9/3247 |
| | | | | 713/176 |
| 2013/0073531 A1* | 3/2013 | Robinson | | G06Q 10/06 |
| | | | | 707/694 |
| 2013/0212270 A1* | 8/2013 | Hsieh | | H04L 67/62 |
| | | | | 709/225 |
| 2013/0247176 A1* | 9/2013 | Itakura | | G06F 21/604 |
| | | | | 726/21 |
| 2014/0282193 A1* | 9/2014 | Bann | | G05B 19/409 |
| | | | | 715/771 |
| 2014/0297589 A1* | 10/2014 | Chen | | G06F 16/275 |
| | | | | 707/624 |
| 2014/0310513 A1* | 10/2014 | Barney | | H04L 9/0841 |
| | | | | 713/153 |
| 2015/0365291 A1* | 12/2015 | Burton | | H04L 41/0893 |
| | | | | 709/226 |
| 2016/0119301 A1* | 4/2016 | Thilgen | | H04L 41/0893 |
| | | | | 726/1 |
| 2016/0171405 A1* | 6/2016 | Burke | | G06Q 10/06313 |
| | | | | 705/7.23 |
| 2016/0205127 A1* | 7/2016 | Roehl | | H04L 63/1433 |
| | | | | 726/25 |
| 2016/0226825 A1* | 8/2016 | Ardeli | | H04L 63/0254 |
| 2017/0350612 A1* | 12/2017 | Christopher | | F24F 11/64 |
| 2018/0088964 A1* | 3/2018 | Hussain | | G06F 9/5061 |
| 2018/0205739 A1* | 7/2018 | Sommerfelt | | G06F 21/6218 |
| 2018/0219958 A1* | 8/2018 | Bernstein | | H04L 41/0895 |
| 2018/0260855 A1* | 9/2018 | Yu | | H04L 67/55 |
| 2018/0288024 A1* | 10/2018 | Munafo | | G16H 40/67 |
| 2018/0316676 A1* | 11/2018 | Gilpin | | H04L 9/0891 |
| 2019/0079744 A1* | 3/2019 | Bosch | | G06F 8/60 |
| 2019/0095593 A1* | 3/2019 | Cisneros | | H04L 9/0897 |
| 2019/0332294 A1* | 10/2019 | Kilari | | G06F 3/0671 |
| 2020/0106781 A1* | 4/2020 | Li | | G06F 17/15 |
| 2020/0120142 A1* | 4/2020 | Maynard | | G06Q 10/067 |
| 2020/0293681 A1* | 9/2020 | Hoa | | G06F 21/554 |
| 2020/0358770 A1* | 11/2020 | Parla | | H04L 63/20 |
| 2021/0021633 A1* | 1/2021 | Landman | | G06F 8/65 |
| 2021/0051178 A1* | 2/2021 | Kuppannan | | H04L 63/20 |
| 2021/0136072 A1* | 5/2021 | Hutcherson | | H04L 63/0892 |
| 2021/0182422 A1* | 6/2021 | Basu | | H04L 9/3213 |
| 2021/0233092 A1* | 7/2021 | Biggerstaff | | G06Q 50/16 |
| 2021/0240914 A1* | 8/2021 | Fryc | | H04L 67/568 |
| 2021/0264018 A1* | 8/2021 | Helles | | G06F 21/45 |
| 2021/0385655 A1* | 12/2021 | Chauhan | | H04W 48/16 |
| 2022/0114248 A1* | 4/2022 | Barros | | G06F 21/44 |
| 2022/0200950 A1* | 6/2022 | Sekar | | H04W 12/06 |
| 2022/0269811 A1* | 8/2022 | Gummadivalli | | G06F 21/6245 |
| 2022/0269812 A1* | 8/2022 | Baez | | G06F 21/50 |

\* cited by examiner

METHOD FOR MANAGING AND CONTROLLING SYSTEM PERMISSION, DATA CENTER, MANAGEMENT AND CONTROL APPARATUS, AND STORAGE MEDIUM

CROSS-REFERENCE TO RELATED APPLICATIONS

This application claims the priority of Chinese Patent Application No. 202110806641.6, submitted to the Chinese Intellectual Property Office on Jul. 16, 2021, the disclosure of which is incorporated herein in its entirety by reference.

TECHNICAL FIELD

The present application relates to the technical field of permission management and control, and in particular, to a method for managing and controlling a system permission, a data center, a management and control apparatus, and a storage medium.

BACKGROUND

With the development of computer technologies, various management systems related to company management have emerged. Each management system is usually provided with a system permission, such that only a user with a relevant permission can access the management system, thereby ensuring security and other performance of the management system.

In addition, most companies often face various personnel changes such as transfer and resignation. In this case, if a system permission of a changed person cannot be changed in time, confidential information of a company is greatly affected, and a misoperation is caused.

SUMMARY

Based on this, it is necessary to provide a method for managing and controlling a system permission, a data center, a management and control apparatus, and a storage medium.

A method for managing and controlling a system permission includes:
  obtaining personnel change information, wherein the personnel change information includes personal information of a changed person and information about a position change mode of the changed person;
  obtaining a current permission interface of the changed person based on the personal information;
  determining, based on the permission interface, whether the changed person has an operation permission for a current object system;
  if the changed person has the operation permission for the current object system, determining whether the position change mode of the changed person is transfer;
  sending a notification message if the position change mode of the changed person is the transfer, wherein the notification message is used to instruct the changed person to re-apply for the operation permission for the current object system; and if the changed person does not re-apply for the operation permission for the current object system, deleting the permission interface for the current object system based on the personal information of the changed person.

A data center includes a memory and a processor, wherein the memory stores a computer program, and the computer program is executed by the processor to implement the steps of the method according to any one of the above items.

A management and control apparatus includes:
  a data center, including a memory and a processor, wherein the memory stores a computer program, and the computer program is executed by the processor to implement the steps of the method according to any one of the above items; and
  a data acquisition system, electrically connected to the data center and configured to acquire relevant information of personnel change information and send the acquired information to the data center.

A computer-readable storage medium stores a computer program, wherein the computer program is executed by a processor to implement the steps of the method according to any one of the above items.

BRIEF DESCRIPTION OF THE DRAWINGS

To describe the technical solutions in the embodiments of the present application or in the traditional technology more clearly, the following briefly describes the accompanying drawings required for describing the embodiments or the traditional technology. Apparently, the accompanying drawings in the following description show some embodiments of the present application, and a person of ordinary skill in the art may still derive other drawings from these accompanying drawings without creative efforts.

DETAILED DESCRIPTION

To facilitate the understanding of the present application, the present application is described more completely below with reference to relevant accompanying drawings. The embodiments of the present application are shown in the accompanying drawings. However, the present application may be embodied in various forms without being limited to the embodiments described herein. These embodiments are provided in order to make the present application more thorough and comprehensive.

Unless otherwise defined, all technical and scientific terms used herein have the same meaning as commonly understood by those skilled in the technical field of the present application. The terms used in the specification of the present application are merely for the purpose of describing specific embodiments, rather than to limit the present application.

It is understandable that the terms such as "first" and "second" used herein may be used to describe different preset time, but the preset time is not limited by these terms. Instead, these terms are merely intended to distinguish one preset time from another.

It should be noted that when a component is "connected" to another component, the component may be connected to the another component directly or via an intermediate component. In addition, a "connection" in the following embodiments should be understood as an "electrical connection" or a "communication connection" if connected objects have electrical signal or data transmission between each other.

In the specification, the singular forms of "a", "an" and "the/this" may also include plural forms, unless clearly indicated otherwise. It should also be understood that the terms such as "including/comprising" and "having" indicate the existence of the stated features, wholes, steps, operations, components, parts or combinations thereof. However, these terms do not exclude the possibility of the existence of one or more other features, wholes, steps, operations, components, parts or combinations thereof. In addition, in the specification, the term "and/or" includes any and all combinations of related listed items.

Figure 1:
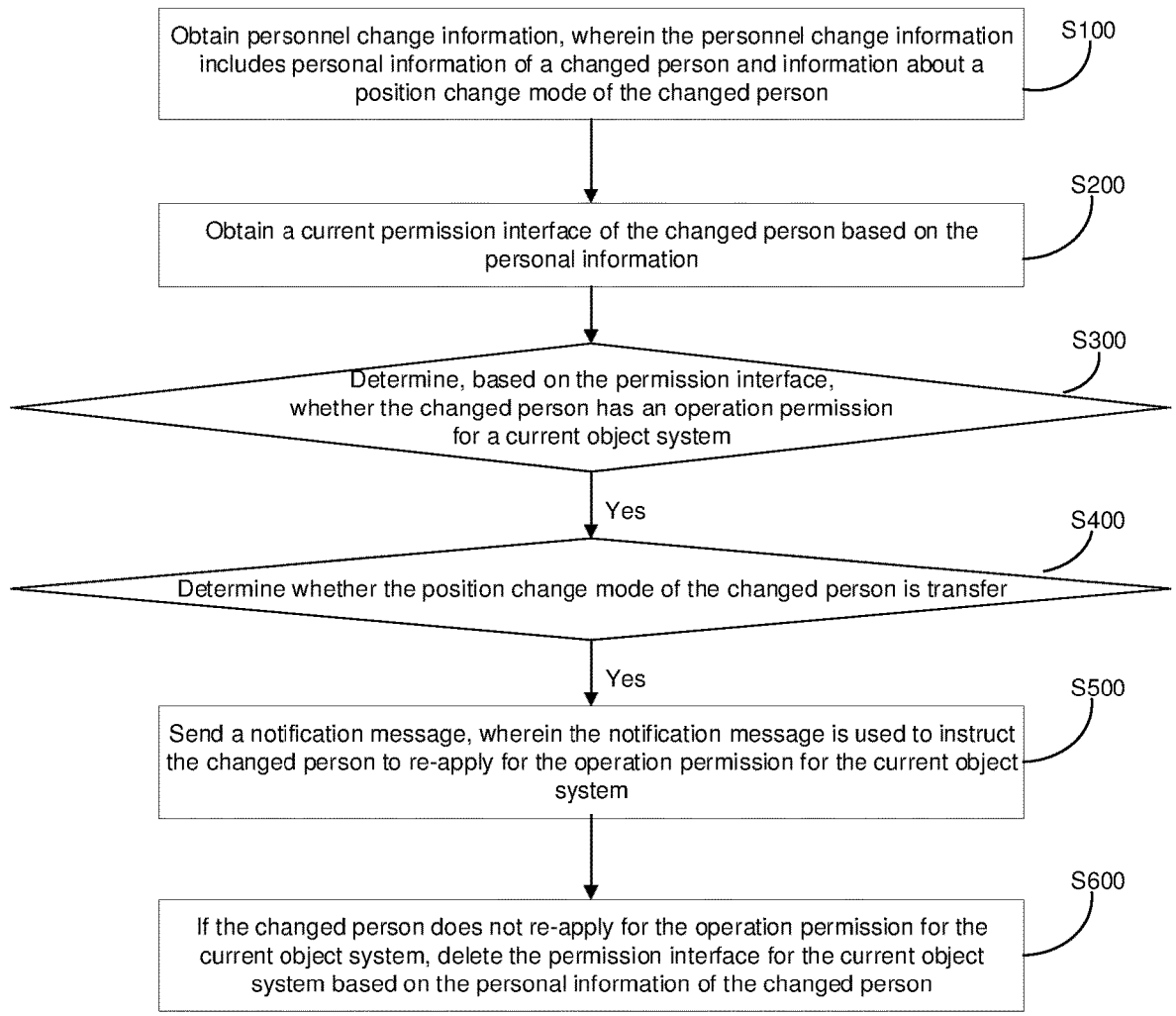
FIG. 1 to FIG. 5 are schematic flowcharts of a method for managing and controlling a system permission according to different embodiments.

In an embodiment, referring to FIG. 1, a method for managing and controlling a system permission is provided, including the following steps:

Step S100: Obtain personnel change information, wherein the personnel change information includes personal information of a changed person and information about a position change mode of the changed person.

Step S200: Obtain a current permission interface of the changed person based on the personal information.

Step S300: Determine, based on the permission interface, whether the changed person has an operation permission for a current object system.

Step S400: If the changed person has the operation permission for the current object system, determine whether the position change mode of the changed person is transfer.

Step S500: Send a notification message if the position change mode of the changed person is the transfer, wherein the notification message is used to instruct the changed person to re-apply for the operation permission for the current object system.

Step S600: If the changed person does not re-apply for the operation permission for the current object system, delete a permission interface for the current object system based on the personal information of the changed person.

In step S100, the personnel change information can be obtained through matching based on personal information and department information of a personnel system in one company. The personnel change information includes the personal information of the changed person and the information about the position change mode of the changed person. The changed person may include a transferred person, a resigned person, or the like. The personal information may include a name, a job number, an ID number, and the like of a person. The information about the position change mode may include transfer, resignation, or the like.

In step S200, various management systems for which permissions are set are usually independent of each other. URL addresses, interface names, interface modes, and the like of the management systems may be different. Therefore, an interface configuration page can be configured in advance. Access links and interfaces of the management systems are configured in a data center such as a web server or a web API. In this case, the permissions of the independent management systems can be managed and controlled centrally.

Then, the interfaces of the management systems can be dynamically invoked based on configuration information of the configuration page, and whether the changed person has a permission for an invoked interface is automatically read based on the personal information of the changed person, so as to obtain management systems whose permission interfaces are currently possessed by the changed person.

It is understandable that when a new management system is added, an access link and an interface of the system can be added to the data center in time, so as to facilitate comprehensive system permission management and control.

In step S300, the current object system is a currently processed and operated system in the management systems.

The management systems whose permission interfaces are currently possessed by the changed person are obtained in step S200. Based on this, whether the current object system belongs to the management systems can be determined, so as to determine whether the changed person has the operation permission for the current object system.

For example, a company has five management systems: a first management system, a second management system, a third management system, a fourth management system, and a fifth management system. It is obtained in step S200 that the changed person currently has permission interfaces for the first management system, the second management system, and the third management system.

In this case, if the current object system is the first management system, the second management system, or the third management system, it can be determined that the changed person has the operation permission for the current object system. If the current object system is the fourth management system or the fifth management system, it can be determined that the changed person does not have the operation permission for the current object system.

In step S400, when the position change mode of the changed person is the transfer, the changed person does not leave a corresponding company, but a position of the changed person is changed. Specifically, the transfer may be a position change between different levels or a position change at a same level, and may be a position change between different departments or a position change within a same department. This is not limited in the present application.

In step S500, when the position change mode of the changed person is the transfer, the changed person is the transferred person.

In this case, the notification message can be sent by e-mail, SMS, or WeChat, so as to instruct the changed person to re-apply for the operation permission for the current object system.

Moreover, as an example, the notification message can also be sent to a manager of each management system while being sent to the changed person, so as to help the manager of each management system effectively manage and control the management system.

Moreover, as an example, while being used to instruct the changed person to re-apply for the operation permission for the current object system, the notification message can also be used to notify the changed person of other relevant information of a system permission, for example, notify a system whose permission is currently possessed by the changed person, and/or a manner of applying for relevant system permission.

In step S600, if the changed person does not re-apply for the operation permission for the current object system, it indicates that the operation permission for the current object system is no longer needed for a new position of the changed person.

In this case, the permission interface for the current object system is deleted for the changed person, which can effectively prevent the transferred person who has been engaged in a non-original position from still having an operation permission for an original position, resulting in a misoperation or disclosure of confidential information of the original position. This can effectively reduce a risk of a major mistake in work and ensure security of confidential information of each department of the company.

In this embodiment, the system permission of the transferred person is effectively managed and controlled, such that the transferred person can re-apply for a permission for a corresponding system after the position transfer, and when the transferred person does not re-apply for the operation permission for the current object system, the permission interface for the corresponding system is deleted. Therefore, this embodiment can effectively ensure that a permission for each management system is only provided for a required person, so as to effectively prevent a risk of a misoperation, and can effectively ensure security of confidential information of the company.

In addition, according to the method for managing and controlling a system permission in this embodiment, a redundant permission of each management system can also be cleared regularly by deleting a system permission interface of the transferred person.

Figure 2:
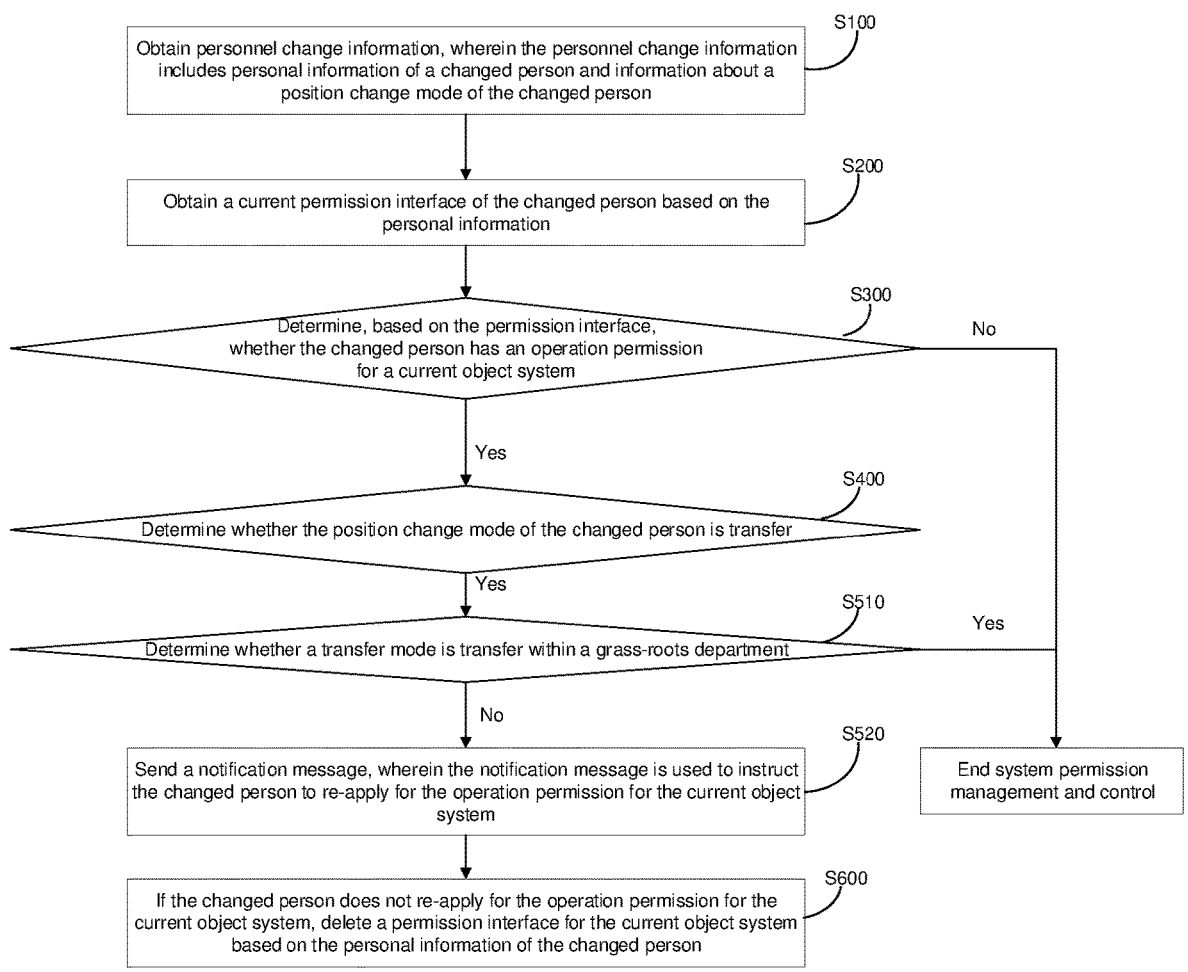

In an embodiment, referring to FIG. 2, after step S300, if the changed person does not have the operation permission for the current object system, system permission management and control ends.

In this case, the current object system can be replaced, until the above determining operation is completed for each management system.

In an embodiment, referring to FIG. 2, the personnel change information further includes a transfer mode. The transfer mode is a specific mode of the transfer. In this case, step S500 includes the following steps:

Step S510: If the position change mode of the changed person is the transfer, determine whether the transfer mode is transfer within a grass-roots department.

Step S520: Send the notification message if the transfer mode is not the transfer within the grass-roots department.

In step S510, as an example, one company may have a first-level department, the first-level may have a second-level department, and the second-level department may have a third-level department. In this case, if the transferred person (namely, the changed person) is transferred under a same three-level department, the transfer can be regarded as the transfer within the grass-roots department. In this case, a same management system needs to be used before and after the transfer.

In step S520, when the transfer mode is not the transfer within the grass-roots department, the notification message is sent, such that the transferred person can selectively re-apply or no longer apply for the current object system based on the new position.

In this embodiment, the notification message may be selectively sent based on different transfer modes, so as to improve effectiveness of the notification message.

Further, this embodiment may further include: ending the system permission management and control if the transfer mode is the transfer within the grass-roots department.

Certainly, if the transfer mode is the transfer within the grass-roots department, the permission interface for the current object system can be added again after being deleted. This is not limited in the present application.

Figure 3:
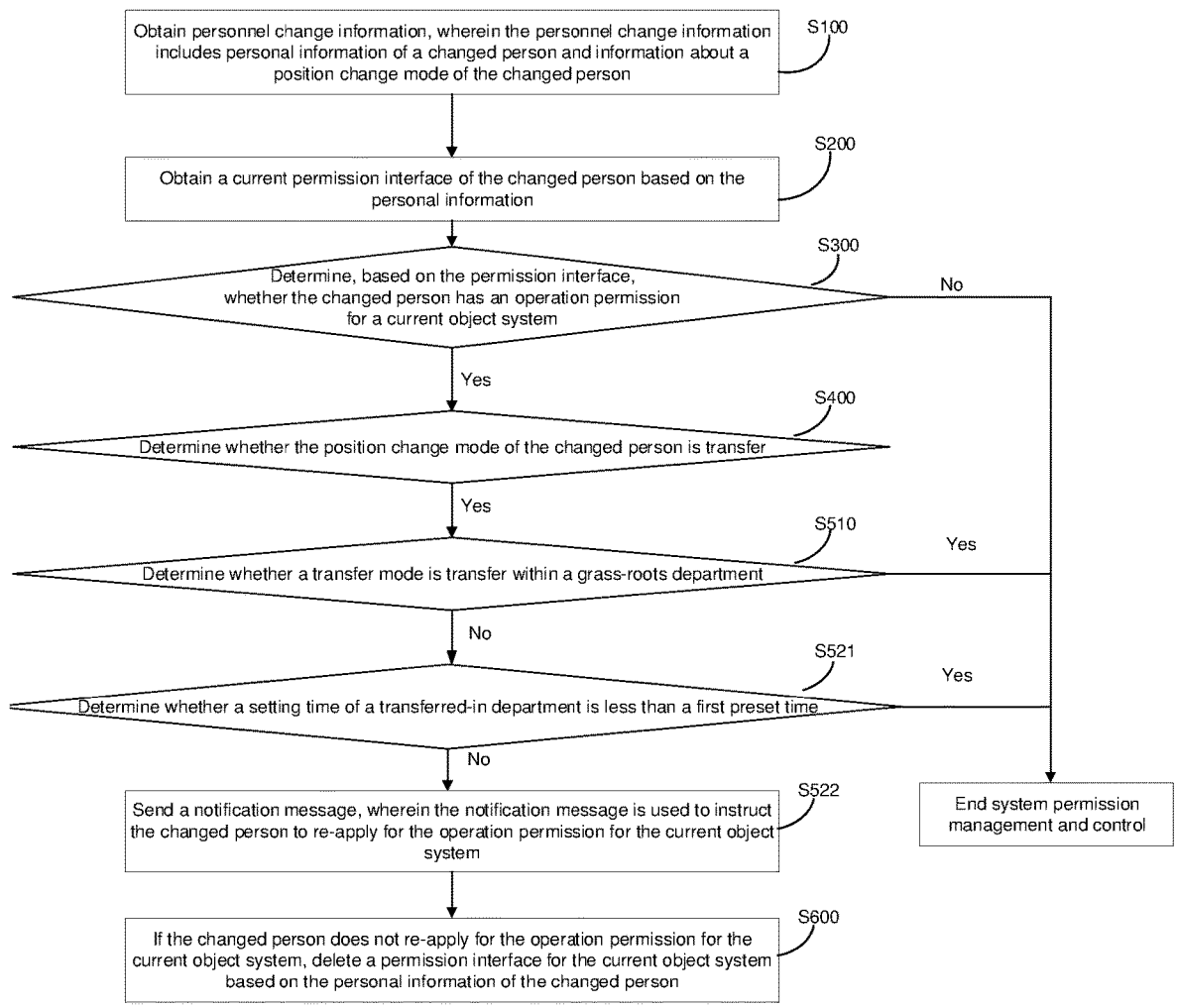

In an embodiment, referring to FIG. 3, step S520 includes the following steps:

Step S521: If the transfer mode is not the transfer within the grass-roots department, determine whether setting time of a transferred-in department is less than first preset time.

Step S522: Send the notification message if the setting time of the transferred-in department is not less than the first preset time.

In step S521, the first preset time may be set based on an actual demand, for example, may be set to one month (30 days).

In step S522, the notification message is sent when the setting time of the transferred-in department is not less than the first preset time, to further improve the effectiveness of the notification message.

Further, this embodiment may further include: ending the system permission management and control if the setting time of the transferred-in department is less than the first preset time.

Specifically, when department A needs to change its name or organization level, a new department, namely, department B, can be created. Then, personnel of department A migrate to department B in large quantities. In this case, department B is a department obtained by changing the name or organization level of department A. Therefore, although the migration of the personnel in department A to department B is not the transfer within the grass-roots department, since department B is the new department that replaces department A, no system permission needs to be changed when the personnel in department A migrate to department B.

In this case, whether the transferred-in department is a department like department B described above is determined based on the first preset time.

If the setting time of the transferred-in department is not less than the first preset time, it indicates that the transferred-in department is not the department like department B described above. In this case, the transferred person is normally transferred, and a management system that the transferred person needs to use after the transfer may be different from that before the transfer. Therefore, it is necessary to send the notification message to enable the transferred person to selectively apply for a permission for the current object system.

If the setting time of the transferred-in department is less than the first preset time, it indicates that the transferred-in department is the department like department B described above. In this case, a department of the transferred person is changed, but the system permission of the transferred person does not need to be changed. Therefore, the system permission management and control can be ended directly to retain the system permission of the transferred person.

This can prevent system permissions of a large quantity of persons from being deleted by mistake due to a change of a whole department or an organization upgrade.

Figure 4:
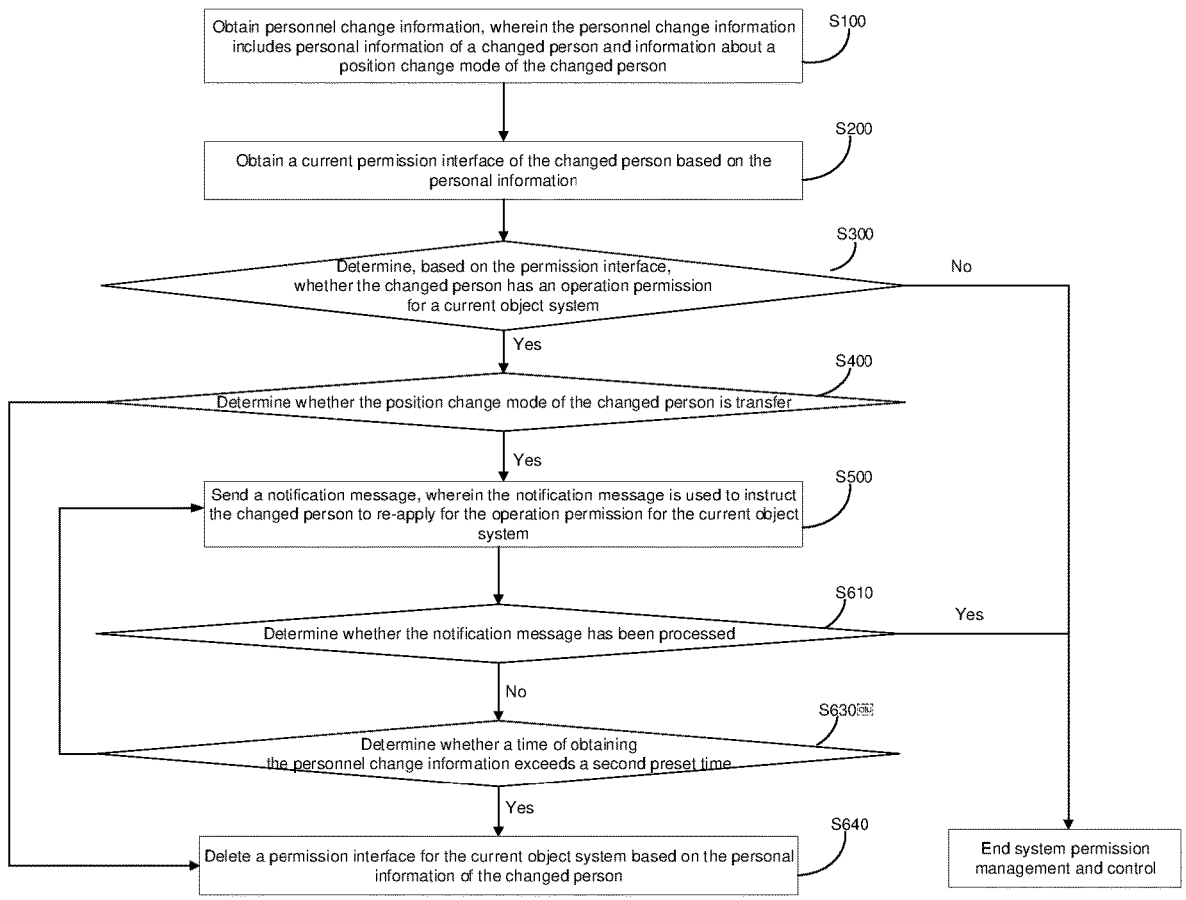

In an embodiment, after step S500, referring to FIG. 4, the method for managing and controlling a system permission further includes the following step:

Step S610: Determine whether the notification message has been processed.

Specifically, that the notification message has been processed may be that the transferred person submits, after receiving the notification message, a user permission application form to apply for changing a permission interface for a corresponding management system, or apply for maintaining a permission interface for an original management system (in other words, maintaining an original permission). Then, after relevant processing based on the application of the transferred person, whether the notification message has been processed is fed back through an interface of processing the transferred person in the data center or the like.

If the notification message has been processed, the system permission management and control ends. In this case, the notification message is no longer sent.

In this embodiment, feedback information on a processing status of the notification message is obtained, so as to effectively change a management and control status in time.

In an embodiment, after step S610, the method for managing and controlling a system permission further includes the following steps:

Step S630: If the notification message has not been processed, determine whether time of obtaining the personnel change information exceeds second preset time.

Step S640: If the time of obtaining the personnel change information exceeds the second preset time, delete the permission interface for the current object system based on the personal information of the changed person.

In step S630, if the notification message has not been processed, the changed person does not re-apply for the operation permission for the current object system.

The second preset time may also be set based on an actual situation, for example, may be set to 7 days. In this embodiment, whether the time of obtaining the personnel change information exceeds the second preset time can be determined to further determine whether position change time of the changed person exceeds the second preset time.

In step S640, if the time of obtaining the personnel change information exceeds the second preset time, it indicates that the position change time of the changed person has exceeded the second preset time (for example, 7 days). In this case, the permission interface for the current object system is deleted for the changed person, such that the changed person no longer has a system permission for the current object system. In this embodiment, if the changed person does not re-apply for the operation permission for the current object system, the permission interface for the current object system is deleted for the changed person after the position change time of the changed person has exceeded the second preset time, so as to provide enough time for the changed person to apply for or cancel the permission for the current object system. In this way, the changed person can obtain a permission for a required system in time.

Further, after step S630, the method for managing and controlling a system permission further includes: if the time of obtaining the personnel change information does not exceed the second preset time, re-sending the notification message.

In this case, the notification message may be sent for a plurality of times to remind the changed person to effectively make relevant applications in time, which can prevent the changed person from forgetting to process a permission for a relevant system due to some uncertain factors.

In an embodiment, after step S400, the method for managing and controlling a system permission further includes: if the position change mode of the changed person is not the transfer, deleting all permission interfaces of the changed person based on the personal information of the changed person.

When the position change mode of the changed person is not the transfer, the position change mode of the changed person may specifically be resignation, retirement, or the like. In this case, all the permission interfaces of the changed person can be deleted based on the personal information of the changed person, which can effectively protect the security of the confidential information of the company and prevent retirees from using their permissions to steal and disclose the confidential information of the company.

In an embodiment, after step S400, the method for managing and controlling a system permission includes: if the position change mode of the changed person is not the transfer, deleting all permission interfaces of the changed person based on the personal information of the changed person when time of obtaining the personnel change information exceeds third preset time.

The third preset time may be set based on an actual situation, for example, may be set to one day.

That the time of obtaining the personnel change information exceeds the third preset time can be used to indicate that resignation time of the changed personnel exceeds the third preset time. A difference between this embodiment and the previous embodiment is that, in this embodiment, all the permission interfaces of the changed person whose position change mode is not the transfer are deleted after the third preset time rather than immediately.

In this way, the changed person whose position change mode is not the transfer can have a period of time to process related work.

For example, an enterprise has a head office C and a branch office D. If an employee is transferred from the head office C to the branch office D, the employee is a resigned employee for the head office C, but is still an employee of the enterprise. In this case, a system permission is reserved for the employee for the third preset time, such that the employee can carry out relevant work normally.

Alternatively, for another example, within the third preset time, a retiree can use the third preset time to hand over relevant work with other personnel.

Figure 5:
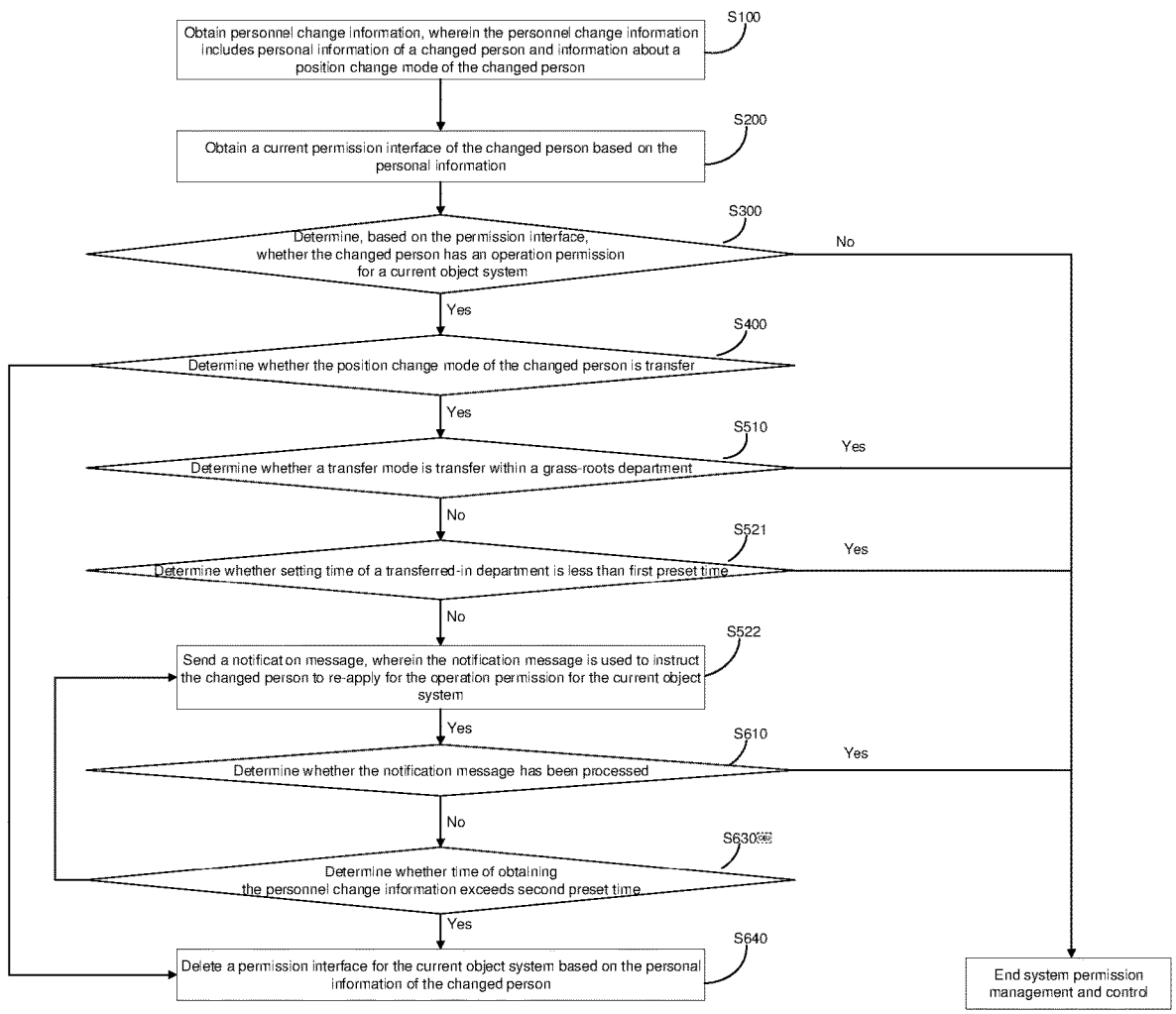

In an embodiment, referring to FIG. 5, a method for managing and controlling a system permission includes the following steps:

Step S100: Obtain personnel change information, wherein the personnel change information includes personal information of a changed person and information about a position change mode of the changed person.

Step S200: Obtain a current permission interface of the changed person based on the personal information.

Step S300: Determine, based on the permission interface, whether the changed person has an operation permission for a current object system.

Step S400: If the changed person has the operation permission for the current object system, determine whether the position change mode of the changed person is transfer.

Step S510: If the position change mode of the changed person is the transfer, determine whether a transfer mode is transfer within a grass-roots department.

Step S521: If the transfer mode is not the transfer within the grass-roots department, determine whether setting time of a transferred-in department is less than first preset time.

Step S522: Send a notification message if the setting time of the transferred-in department is not less than the first preset time.

Step S610: Determine whether the notification message has been processed.

Step S630: If the notification message has not been processed, determine whether time of obtaining the personnel change information exceeds second preset time.

Step S640: If the time of obtaining the personnel change information exceeds the second preset time, delete a permission interface for the current object system based on the personal information of the changed person.

In addition, after step S400, if the position change mode of the changed person is not the transfer, all permission interfaces of the changed person are deleted based on the personal information of the changed person.

After step S510, system permission management and control end if the transfer mode is the transfer within the grass-roots department.

After step S521, the system permission management and control end if the setting time of the transferred-in department is less than the first preset time.

After step S610, the system permission management and control end if the notification message has been processed.

After step S630, if the time of obtaining the personnel change information does not exceed the second preset time, the notification message is re-sent.

It should be understood that although the steps in the flowcharts of FIG. 1 to FIG. 5 are shown in turn as indicated by arrows, these steps are not necessarily performed in turn as indicated by the arrows. The execution order of these steps is not strictly limited, and these steps may be executed in other orders, unless clearly described otherwise.

Moreover, at least some of the steps in FIG. 1 to FIG. 5 may include a plurality of sub-steps or stages. The sub-steps or stages are not necessarily executed at the same time, but may be executed at different times. The sub-steps or stages are not necessarily carried out sequentially, but may be executed alternately with other steps or at least some of sub-steps or stages of other steps.

In an embodiment, a data center is further provided. The data center includes a memory and a processor, wherein the memory stores a computer program, and the computer program is executed by the processor to implement the steps of the method in the above embodiments.

Figure 6:
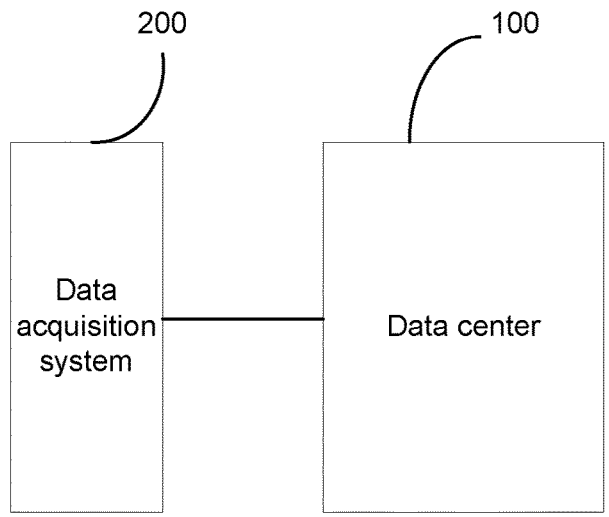
FIG. 6 is a structural block diagram of a management and control apparatus according to an embodiment.

In an embodiment, referring to FIG. 6, a management and control apparatus is further provided, including a data center 100 and a data acquisition system 200.

The data center 100 includes a memory and a processor, wherein the memory stores a computer program, and the computer program is executed by the processor to implement the steps of the method in the above embodiments. As an example, the data center may be a web server or a web API.

The data acquisition system 200 is electrically connected to the data center 100 and configured to acquire personnel change information and send the acquired personnel change information to the data center. As an example, the data acquisition system 200 may be a personnel system, which can send personal information and department information of a company to the data center 100. Then, the data center 100 obtains the personnel change information through matching based on the personal information and the department information of the company.

For specific limitations on the data center and the management and control apparatus, reference may be made to the above limitations on the method for managing and controlling a system permission. Details are not described herein again. The modules of the management and control apparatus may be implemented in whole or in part by software, hardware, or any combination thereof. The modules may be embedded in or independent of a processor of a computer device in a form of hardware, or stored in a memory of the computer device in a form of software, such that the processor can easily invoke and execute corresponding operations of the modules. It should be noted that the division of modules in this embodiment of the present application is schematic, which is only logical function division, and there may be another division method in actual implementation.

In an embodiment, a computer-readable storage medium is provided. The computer-readable storage medium stores a computer program, and the computer program is executed by a processor to implement the following steps: Step S100: Obtain personnel change information, wherein the personnel change information includes personal information of a changed person and information about a position change mode of the changed person.

Step S200: Obtain a current permission interface of the changed person based on the personal information.

Step S300: Determine, based on the permission interface, whether the changed person has an operation permission for a current object system.

Step S400: If the changed person has the operation permission for the current object system, determine whether the position change mode of the changed person is transfer.

Step S500: Send a notification message if the position change mode of the changed person is the transfer, wherein the notification message is used to instruct the changed person to re-apply for the operation permission for the current object system.

Step S600: If the changed person does not re-apply for the operation permission for the current object system, delete a permission interface for the current object system based on the personal information of the changed person.

Those of ordinary skill in the art can understand that all or part of the processes of realizing the method in the above embodiments can be completed by a computer program instructing relevant hardware. The computer program may be stored in a non-volatile computer-readable storage medium. When the computer program is executed, the processes of the above method embodiments are performed. Any reference to a memory, a storage, a database, or other media used in the embodiments of the present application may include a non-volatile and/or volatile memory. The non-volatile memory may include a read-only memory (ROM), a magnetic tape, a floppy disk, a flash memory, or an optical memory. The volatile memory may include a random access memory (RAM) or an external cache memory. As an illustration rather than a limitation, the RAM may be in various forms, such as a static random access memory (SRAM) or a dynamic random access memory (DRAM).

In the specification, the description of terms such as "an embodiment" means that a specific feature, structure, material or characteristic described in combination with the embodiment or example are included in at least one embodiment or example of the present disclosure. In the specification, the schematic description of the above terms does not necessarily refer to the same embodiment or example.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Only several implementations of the present application are described in detail in the above embodiments, but they should not therefore be construed as limiting the scope of the present disclosure. It should be noted that those of ordinary skill in the art can further make variations and improvements without departing from the conception of the present application. These variations and improvements all fall within the protection scope of the present application. Therefore, the protection scope of the present application should be subject to the protection scope defined by the claims.

The invention claimed is:

1. A method for managing and controlling a system permission, comprising:
    obtaining personnel change information, wherein the personnel change information comprises personal information of a changed person and information about a position change mode of the changed person;

obtaining a current permission interface of the changed person based on the personal information;

determining, based on the permission interface, whether the changed person has an operation permission for a current object system;

when the changed person has the operation permission for the current object system, determining whether the position change mode of the changed person is transfer;

sending a notification message when the position change mode of the changed person is the transfer, wherein the notification message is used to instruct the changed person to re-apply for the operation permission for the current object system; and when the changed person does not re-apply for the operation permission for the current object system, deleting the permission interface for the current object system based on the personal information of the changed person.

2. The method for managing and controlling the system permission according to claim 1, wherein when the changed person does not have the operation permission for the current object system, system permission management and control ends.

3. The method for managing and controlling the system permission according to claim 1, wherein the personnel change information further comprises a transfer mode, and the sending a notification message when the position change mode of the changed person is the transfer comprises:

when the position change mode of the changed person is the transfer, determining whether the transfer mode is transfer within a grass-roots department; and sending the notification message when the transfer mode is not the transfer within the grass-roots department.

4. The method for managing and controlling the system permission according to claim 3, wherein when the transfer mode is the transfer within the grass-roots department, system permission management and control ends.

5. The method for managing and controlling the system permission according to claim 3, wherein the sending the notification message when the transfer mode is not the transfer within the grass-roots department comprises:

when the transfer mode is not the transfer within the grass-roots department, determining whether a setting time of a transferred-in department is less than a first preset time; and sending the notification message when the setting time of the transferred-in department is not less than the first preset time.

6. The method for managing and controlling the system permission according to claim 5, wherein when the setting time of the transferred-in department is less than the first preset time, system permission management and control ends.

7. The method for managing and controlling the system permission according to claim 1, after the sending a notification message when the position change mode of the changed person is the transfer, further comprising:

determining whether the notification message has been processed; and ending system permission management and control when the notification message has been processed.

8. The method for managing and controlling the system permission according to claim 7, wherein when the notification message has not been processed, whether time of obtaining the personnel change information exceeds a second preset time is determined; and when the time of obtaining the personnel change information exceeds the second preset time, the permission interface for the current object system is deleted based on the personal information of the changed person.

9. The method for managing and controlling the system permission according to claim 8, wherein when the time of obtaining the personnel change information does not exceed the second preset time, the notification message is re-sent.

10. The method for managing and controlling the system permission according to claim 1, wherein when the position change mode of the changed person is not the transfer, all permission interfaces of the changed person are deleted based on the personal information of the changed person.

11. The method for managing and controlling the system permission according to claim 1, wherein when the position change mode of the changed person is not the transfer, all permission interfaces of the changed person are deleted based on the personal information of the changed person when time of obtaining the personnel change information exceeds a third preset time.

12. A data center, comprising a memory and a processor, wherein the memory stores a computer program, and the computer program is executed by the processor to implement the steps of the method according to claim 1.

13. A management and control apparatus, comprising:

a data center, comprising a memory and a processor, wherein the memory stores a computer program, and the computer program is executed by the processor to implement the steps of the method according to claim 1; and a data acquisition system, electrically connected to the data center and configured to acquire relevant information of personnel change information and send the acquired information to the data center.

14. The management and control apparatus according to claim 13, wherein the data center comprises a web server or a web application programming interface (API), and the data acquisition system comprises a personnel system.

15. A computer-readable storage medium, wherein the computer-readable storage medium stores a computer program, and the computer program is executed by a processor to implement the steps of the method according to claim 1.

* * * * *